(12) United States Patent
Nielsen

(10) Patent No.: US 11,229,861 B2
(45) Date of Patent: Jan. 25, 2022

(54) SLUDGE HARVESTER IMPROVEMENTS

(71) Applicant: AIRRAT PTY LTD, Kingscliff (AU)

(72) Inventor: Ian Bradley Nielsen, Kingscliff (AU)

(73) Assignee: AIRRAT PTY LTD, Kingscliff (AU)

( * ) Notice: Subject to any disclaimer, the term of this patent is extended or adjusted under 35 U.S.C. 154(b) by 81 days.

(21) Appl. No.: 16/604,271

(22) PCT Filed: Apr. 12, 2018

(86) PCT No.: PCT/AU2018/050330
§ 371 (c)(1),
(2) Date: Oct. 10, 2019

(87) PCT Pub. No.: WO2018/187842
PCT Pub. Date: Oct. 18, 2018

(65) Prior Publication Data
US 2020/0147521 A1 May 14, 2020

(30) Foreign Application Priority Data
Apr. 13, 2017 (AU) .................................. 2017901361

(51) Int. Cl.
*B01D 21/24* (2006.01)
*B08B 9/093* (2006.01)
(Continued)

(52) U.S. Cl.
CPC ..... *B01D 21/2466* (2013.01); *B01D 21/2472* (2013.01); *B08B 9/0856* (2013.01);
(Continued)

(58) Field of Classification Search
CPC ............. B01D 21/0006; B01D 21/245; B01D 21/2466; B01D 21/2472; B08B 9/0856;
(Continued)

(56) References Cited

U.S. PATENT DOCUMENTS

| 491,843 A | 2/1893 | Kauser |
| 1,415,113 A | 5/1922 | Phillips |

(Continued)

FOREIGN PATENT DOCUMENTS

| DE | 29924750 U1 | 7/2006 |
| EP | 0091264 A1 | 10/1983 |

(Continued)

OTHER PUBLICATIONS

AIRRAT [retrieved from internet on May 16, 2018], <URL: https://web.archive.org/web/20110216035509/http://www.uat.com.au/airrat.htm 1> published on Feb. 16, 2011.

(Continued)

*Primary Examiner* — Christopher Upton
(74) *Attorney, Agent, or Firm* — Honigman LLP

(57) ABSTRACT

Apparatus for collecting solids settling at the bottom of a liquid reservoir, the apparatus including: a plurality of suction head assemblies, each suction head assembly including a hollow suction head configured to cause agitation of solids settling in or around the suction head and draw the solids entrained in a liquid flow into one or more outlets of the suction head; a manifold including a body having one or more inlets coupled to the one or more outlets of each suction head to permit the collected solids entrained in the liquid flow to pass into the manifold and one or more discharge ports configured to expel the collected solids entrained in the liquid flow from the manifold; and a pumping arrangement that draws in liquid and entrained solids from the suction head assemblies via the manifold and discharges the liquid and entrained solids via a discharge pipe.

11 Claims, 9 Drawing Sheets

(51) Int. Cl.
  *C02F 1/00* (2006.01)
  *E02F 3/88* (2006.01)
  *B08B 9/08* (2006.01)
  *C02F 103/00* (2006.01)

(52) U.S. Cl.
  CPC .............. *B08B 9/0933* (2013.01); *C02F 1/00* (2013.01); *E02F 3/8875* (2013.01); *C02F 2001/007* (2013.01); *C02F 2103/007* (2013.01)

(58) Field of Classification Search
  CPC ........ B08B 9/0933; E02F 3/88; E02F 3/8858; E02F 3/8875; E02F 3/92
  USPC .......... 210/170.04, 170.09, 523, 527, 747.4, 210/747.9, 803; 37/317, 320, 323, 342
  See application file for complete search history.

(56) References Cited

U.S. PATENT DOCUMENTS

| | | | |
|---|---|---|---|
| 1,964,951 A | | 7/1934 | Kertzman |
| 2,141,811 A | | 12/1938 | Everson |
| 2,204,584 A | | 6/1940 | Butler |
| 2,236,128 A | * | 3/1941 | Sydney ................ B01D 21/245 210/531 |
| 2,646,889 A | | 7/1953 | Dulak |
| 3,245,420 A | | 4/1966 | Alexander |
| 3,622,009 A | * | 11/1971 | Bordner ............. B01D 21/2466 210/528 |
| 3,738,029 A | | 6/1973 | Harmon |
| 3,796,658 A | | 3/1974 | Meissner |
| 3,797,664 A | | 3/1974 | Pentz et al. |
| 3,847,802 A | * | 11/1974 | Lemke ............... B01D 21/2466 210/527 |
| 3,967,393 A | | 7/1976 | Nixon |
| 3,969,249 A | * | 7/1976 | Dodd ................ B01D 21/2477 210/170.09 |
| 4,111,809 A | | 9/1978 | Pichon |
| 4,146,982 A | | 4/1979 | Norisgui |
| 4,152,800 A | | 5/1979 | Nilsmar |
| 4,190,541 A | | 2/1980 | Wade et al. |
| 4,211,020 A | | 7/1980 | Holekamp |
| 4,647,374 A | | 3/1987 | Ziaylek et al. |
| 4,776,112 A | | 10/1988 | Urbani |
| 4,819,346 A | | 4/1989 | Maitlen |
| 4,911,831 A | | 3/1990 | Davison et al. |
| 4,957,622 A | | 9/1990 | Mims et al. |
| 5,198,125 A | | 3/1993 | Coudriet et al. |
| 5,340,485 A | | 8/1994 | Bradley et al. |
| 5,490,920 A | | 2/1996 | Fruchtbaum et al. |
| 5,584,993 A | | 12/1996 | Van Der Schrieck |
| 6,199,237 B1 | | 3/2001 | Budden |
| 6,584,709 B2 | | 7/2003 | Martel, Jr. et al. |
| 6,951,620 B2 | | 10/2005 | Brauch et al. |
| 7,181,871 B2 | | 2/2007 | Sower |
| 7,754,073 B2 | | 7/2010 | Nielsen |
| 7,767,094 B2 | | 8/2010 | Nielsen |
| 7,892,438 B2 | * | 2/2011 | Nielsen ................ E02F 3/8841 210/803 |
| 2003/0062319 A1 | | 4/2003 | Keller et al. |
| 2004/0158943 A1 | | 8/2004 | Popielarczyk et al. |
| 2005/0211637 A1 | | 9/2005 | Sower |
| 2009/0001030 A1 | | 1/2009 | Nielsen et al. |
| 2012/0312339 A1 | | 12/2012 | Pashaian et al. |

FOREIGN PATENT DOCUMENTS

| | | |
|---|---|---|
| GB | 2459700 A | 11/2009 |
| JP | 5045032 | 12/1975 |
| JP | 527930 | 1/1977 |
| JP | 5799706 | 6/1982 |
| JP | 6145735 B2 | 10/1986 |
| JP | 0313357 | 2/1991 |
| JP | 6104982 B2 | 12/1994 |
| JP | 09038610 A | 2/1997 |
| JP | 2004190421 A | 7/2004 |
| SE | 199303307 A | 4/1995 |
| WO | 2004094032 A1 | 11/2004 |
| WO | 2005028069 A1 | 3/2005 |

OTHER PUBLICATIONS

Australian Patent Office (ISA), International Search Report and Written Opinion for International Application No. PCT/AU2018/050330, dated May 23, 2018.

* cited by examiner

SLUDGE HARVESTER IMPROVEMENTS

CROSS-REFERENCE TO RELATED APPLICATIONS

This application is a National Phase Application of International Application PCT/AU2018/050330, filed Apr. 12, 2018, which claims priority to Australian Patent Application No. 2017901361, filed Apr. 13, 2017, the disclosures of which are incorporated herein by reference in their entirety.

FIELD OF THE INVENTION

The present invention relates to a method and apparatus for collecting and/or separating solids settling at the bottom of a liquid reservoir. In at least one embodiment, the invention relates to a sludge harvester for collecting solids such as sludge settling on the bottom of the liquid reservoir.

BACKGROUND OF THE INVENTION

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In many situations it is either desirable or necessary to separate solids or other materials from liquids. For example, in aquaculture ponds, there tends to be, over a period of time, an increase in solid matter in the pond water which may be undigested food, excrement from fish or crustaceans being grown in the ponds or any other form of organic and inorganic solid material. As a result of the build up of this solid matter, it is necessary to empty the pond at regular intervals usually at harvest time which creates an environmental problem in liquid disposal.

Further, heavy machinery is usually required to be used at considerable cost to remove and spread the solid matter which has settled as sludge on the base of the pond. The pond is then required to be refilled necessitating use of a large quantity of water. Where the aquaculture system uses fresh water, refilling of the pond provides a drain on natural resources and therefore is becoming environmentally unacceptable. It would be advantageous therefore to reduce the frequency at which changing the pond water in aquaculture systems is undertaken. It would also be advantageous to remove or contain the sludge in the effluent water from agricultural ponds to reduce the effects of solids discharge into the natural waterways and contain and/or remove the sludge or solid wastes from within the pond prior to discharge.

AU2004273539 describes an apparatus for collecting solids settling on the bottom of a liquid reservoir and/or floating solids, the apparatus having a hollow suction head and at least one outlet duct extending from the suction head. Air can be supplied to the suction head to create a suction pressure in the suction head to cause settling solids beneath the suction head to pass along the outlet duct or ducts. The suction head may be connected to a collector which is provided with a float to support the collector at the surface of the liquid, and the outlet duct or ducts are connected to the collector which collects the solids. The collector may also have an inlet to collect floating solids.

SUMMARY OF THE PRESENT INVENTION

In one broad form an aspect of the present invention seeks to provide an apparatus for collecting solids settling at the bottom of a liquid reservoir, the apparatus including: a plurality of suction head assemblies, each suction head assembly including a hollow suction head configured to cause agitation of solids settling in or around the suction head and to draw the solids entrained in a liquid flow into one or more outlets of the suction head; a manifold including a body having: one or more inlets coupled to the one or more outlets of each suction head to permit the collected solids entrained in the liquid flow to pass into the manifold, and, one or more discharge ports configured to expel the collected solids entrained in the liquid flow from the manifold; and, a pumping arrangement that draws in liquid and entrained solids from the suction head assemblies via the manifold and discharges the liquid and entrained solids via a discharge pipe.

In one embodiment, the pumping arrangement includes a suction pump including an inlet coupled to the discharge port and an outlet coupled to the discharge pipe.

In one embodiment, the suction pump is submerged in the liquid reservoir.

In one embodiment, the suction pump is an air operated diaphragm pump.

In one embodiment, the apparatus further includes: an air supply, and, an air supply line connected to the air supply and the suction pump.

In one embodiment, the apparatus includes a pontoon that supports at least one of: suction head assemblies; a suction pump; and, an air compressor.

In one embodiment, the discharge pipe extends to a shore based tank arrangement.

In one embodiment, the tank arrangement includes a plurality of collection tanks configured to allow progressive clarification of the discharge through settling of the solid material.

In one embodiment, the tank arrangement includes a vehicle for removing at least the solid material.

In one embodiment, the one or more outlets of each suction head and the one or more corresponding inlets of the manifold comprise spigots to which one or more coupling members are engaged to thereby interconnect the suction head assemblies to the manifold.

In one embodiment, the plurality of suction head assemblies are arranged side-by-side and supported on skids to assist the apparatus traverse along the bottom of the liquid reservoir.

In one embodiment, the one or more chains are disposed beneath each suction head, the chains contactable with the bottom of the liquid reservoir to assist in displacing the settled solids as the apparatus is traversed along the bottom of the reservoir.

In one embodiment, each suction head includes an elongated body which has an open lower side defining a mouth and a skirt disposed around the mouth to at least one of improve containment of the collected solids and control release of air bubbles from the air diffuser.

In one broad form an aspect of the present invention seeks to provide a method of collecting solids settling at the bottom of a liquid reservoir, the method including: providing an apparatus for collecting solids settling at the bottom of a liquid reservoir, and, traversing the apparatus along the bottom of the liquid reservoir so as to collect solids settling on the bottom.

In one broad form an aspect of the present invention seeks to provide an apparatus for collecting solids settling at the bottom of a liquid reservoir, the apparatus including: a plurality of suction head assemblies, each suction head assembly including a hollow suction head configured to cause agitation of solids settling in or around the suction head and to draw the solids entrained in a liquid flow into one or more outlets of the suction head; a manifold including a body having: one or more inlets coupled to the one or more outlets of each suction head to permit the collected solids entrained in the liquid flow to pass into the manifold, and, one or more discharge ports configured to expel the collected solids entrained in the liquid flow from the manifold; and, a plurality of buoyant collection tanks positioned to receive the collected solids entrained in the liquid flow from the one or more discharge ports of the manifold.

In one embodiment the plurality of collection tanks includes three interconnected tanks arranged side-by-side.

In one embodiment the three tanks include: a first outer tank; a second outer tank; and, an inner tank arranged between the first and second outer tanks, and, wherein, the one or more discharge ports of the manifold are positioned to expel the collected solids entrained in the liquid flow into at least one of the first or second outer tanks.

In one embodiment a first discharge port expels collected solids entrained in the liquid flow into the first outer tank and a second discharge port expels collected solids entrained in the liquid flow into the second outer tank.

In one embodiment the tanks are interconnected by pipework to allow flow from the first and second outer tanks into the inner tank.

In one embodiment the pipework between the first and second outer tanks and the inner tank includes a pipe that is bent proximate first or second ends.

In one embodiment the bend is substantially 90 degrees.

In one embodiment the pipe between each respective outer tank and inner tank is pivotable at least 90 degrees to permit the orientation of the first or second end to vary relative to the respective outer and/or inner tank.

In one embodiment the inner tank includes an outlet for passage of clarified liquid out of the inner tank and back into the liquid reservoir.

In one embodiment each collection tank includes a sump at a lower portion thereof in which solids settle.

In one embodiment the tanks are supported by a common framework.

In one embodiment the manifold includes: a horizontal portion in which the inlets are disposed; and, one or more upstanding end portions that terminate in the one or more discharge ports.

In one embodiment the one or more outlets of each suction head and the one or more corresponding inlets of the manifold comprise spigots to which one or more coupling members are engaged to thereby interconnect the suction head assemblies to the manifold.

In one embodiment the apparatus further includes: an air supply, an air supply line connected to the air supply-, and, a plurality of air diffusers, each air diffuser positioned within a respective suction head and interconnected to the air supply line to enable air from the air supply to be introduced into each suction head.

In one embodiment the air supply line is disposed outside of the suction head assemblies.

In one embodiment the air supply line has outlets interconnected with inlets of each air diffuser disposed proximate opposing ends thereof.

In one embodiment each air diffuser comprises a hollow elongated pipe including a plurality of air outlets, wherein in use, air enters the air diffuser through the inlets and exits as a stream of air bubbles via the outlets to thereby create a suction pressure in the suction head.

In one embodiment the plurality of suction head assemblies are arranged side-by-side and supported on skids to assist the apparatus traverse along the bottom of the liquid reservoir.

In one embodiment one or more chains are disposed beneath each suction head, the chains contactable with the bottom of the liquid reservoir to assist in displacing the settled solids as the apparatus is traversed along the bottom of the reservoir.

In one embodiment each suction head includes an elongated body which has an open lower side defining a mouth and a skirt disposed around the mouth to at least one of improve containment of the collected solids and control release of air bubbles from the air diffuser.

In one broad form an aspect of the present invention seeks to provide a method of collecting solids settling at the bottom of a liquid reservoir, the method including: providing an apparatus as per the other broad form; and, traversing the apparatus along the bottom of the liquid reservoir so as to collect solids settling on the bottom and discharge the collected solids into the collection tanks.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Various examples and embodiments of the present invention will now be described with reference to the accompanying drawings, in which: —

DETAILED DESCRIPTION OF THE PREFERRED EMBODIMENTS

Figure 1A:
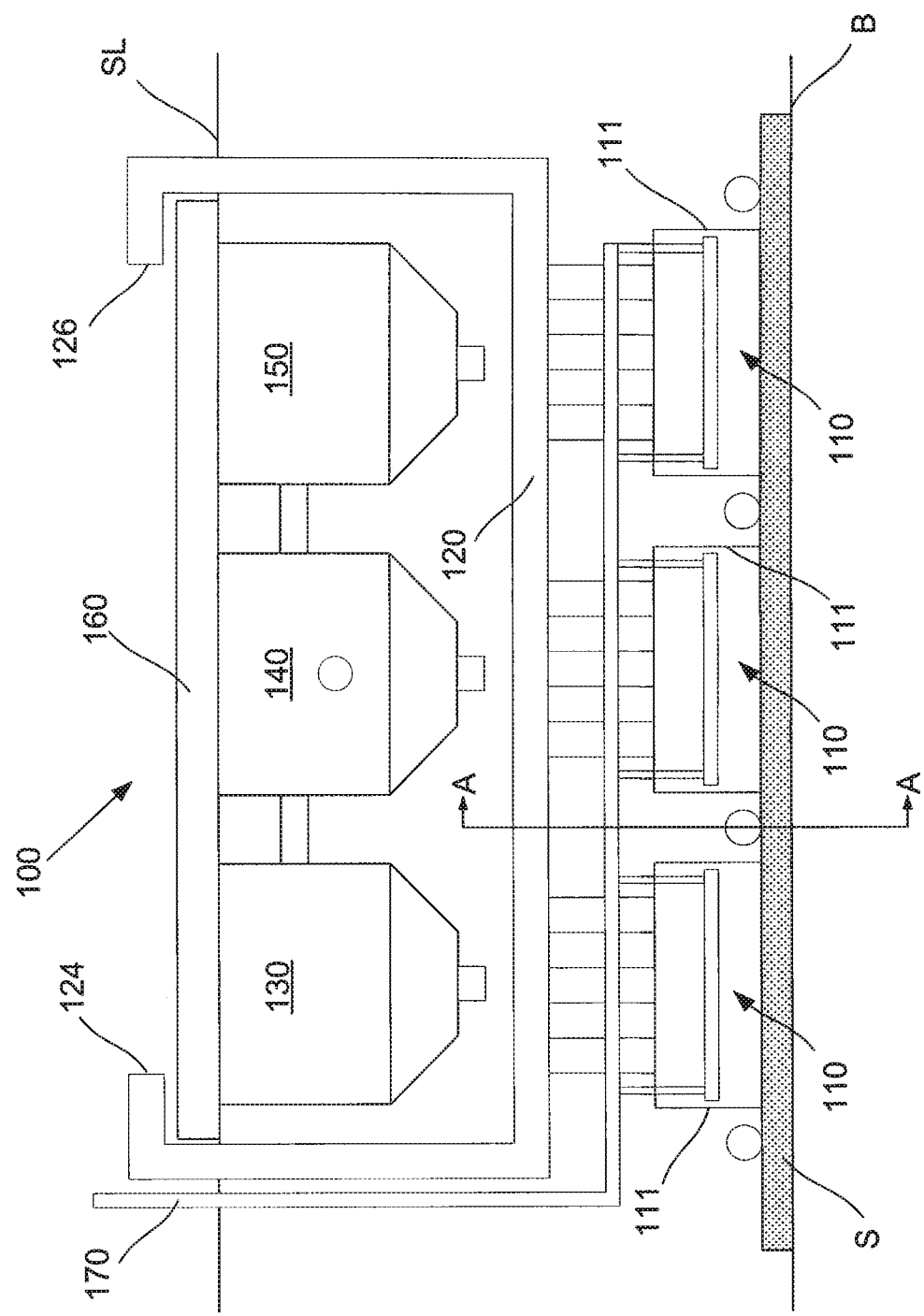
FIG. 1A is a schematic front view of an example of an apparatus for collecting solids settling at the bottom of a liquid reservoir.

An example of an apparatus 100 for collecting solids settling at the bottom B of a liquid reservoir will now be described with reference to FIGS. 1A and 1B.

For the purpose of this example, the liquid reservoir is assumed to be a pond, tank, lagoon, lake, or the like, containing a liquid that includes one or more other components such as suspended solids, slurry, sludge or the like, that settle on the bottom of the reservoir. In one preferred form, the liquid reservoir is an aquaculture or settling pond having a sludge layer on the bottom that requires periodic removal.

The apparatus 100 may however be used in many different applications where solids are required to be separated in situ or in field locations such as in mining, chemical treatment, manufacturing, or abattoir effluent ponds, agricultural applications such as piggeries, dairies, poultry farms and animal feed lots as well as for maintenance of the health of recreational ponds or lakes at golf course, council parks, and residential canal developments.

Reference to "solids" is taken to include solids or other materials that are entrained in liquids including coarse, fine, suspended or settleable materials such as slurry or sludge.

In this example, the apparatus 100 includes a plurality of suction head assemblies 110, each suction head assembly 110 including a hollow suction head 111 configured to cause agitation of solids S settling in or around the suction head 111 and to draw the solids S entrained in a liquid flow into one or more outlets 112 of the suction head 111.

The apparatus 100 further includes a manifold 120 including a body having one or more inlets 122 coupled to the one or more outlets 112 of each suction head 111 to permit the collected solids S entrained in the liquid flow to pass into the manifold. The manifold 120 further includes one or more discharge ports 124, 126 configured to expel the collected solids S entrained in the liquid flow from the manifold 120. As shown in FIG. 1B, the inlets 122 may be coupled to the outlets 112 of each suction head 111 by coupling members 128 which may be formed from appropriate tubing, piping or ducting.

A plurality of buoyant collection tanks 130, 140, 150 are positioned to receive the collected solids S entrained in the liquid flow from the one or more discharge ports 124, 126 of the manifold 120. The collection tanks 130, 140, 150 are typically configured to float at or near the surface level SL of the liquid reservoir with the suction head assemblies 110 operating underneath collecting slurry, sludge or the like off of the floor or bottom B of the liquid reservoir. At regular intervals, the apparatus 100 may be moved to a bank of the liquid reservoir to allow removal of the solids collected in the tanks 130, 140,150. Alternatively, a submergible pump may be placed within each collection tank 130, 140, 150, or a non-submerged pump may be mounted on a frame of the tanks, to pump the collected solids S to the bank of the liquid reservoir for disposal.

The above described arrangement provides a number of advantages. Firstly, the apparatus integrates multiple suction heads into a single apparatus. This enables a greater surface area of the bottom of the reservoir to be traversed by the apparatus, thereby increasing efficiency of operation.

Each suction head assembly is connected to a common manifold having discharge ports to expel the collected solids entrained in the liquid flow into the collection tanks. Solids collected by each suction head assembly are therefore drawn into a single manifold. This provides a simplified construction compared to previous systems in which long outlet ducts were required to run from each outlet of a suction head up to a collection tank which had to be configured to couple to the outlet ducts. In the present arrangement, the common manifold permits any desired number of suction head assemblies to be coupled thereto. As each suction head assembly is directly coupled to the manifold and not to any particular collection tank, it becomes possible for the apparatus to have more suction head assemblies than collection tanks which means that the reservoir can be cleaned both more efficiently and more cost effectively than previous systems have allowed.

A number of further features shall now be described.

In one example, the plurality of collection tanks includes three interconnected tanks arranged side-by-side. As will be discussed further below, this symmetric arrangement assists in balancing the tanks as they begin to fill with effluent that is discharged from the suction head assemblies. In this configuration, the three tanks include a first outer tank, a second outer tank, and an inner tank arranged between the first and second outer tanks, and, wherein, the one or more discharge ports of the manifold are positioned to expel the collected solids S entrained in the liquid flow into at least one of the first or second outer tanks.

Typically, a first discharge port expels collected solids S entrained in the liquid flow into the first outer tank and a second discharge port expels collected solids S entrained in the liquid flow into the second outer tank. In use, a substantial portion of the coarser solid material with higher specific gravity and sedimentation rates will settle in the outer tanks as they begin to fill with the effluent discharged from the manifold.

The collection tanks are typically arranged to permit a controlled flow of effluent from the outer tanks to the inner tank. In this regard, the tanks are typically interconnected by pipework to allow flow from the first and second outer tanks into the inner tank. For example, the pipework may be configured so that once the effluent reaches a certain height in the outer tanks it is allowed to start flowing into the inner tank. As such, the inflow into the inner tank is typically effluent with finer solid material having lower specific gravity and sedimentation rates. Accordingly, the tank arrangement may allow a progressive reduction of settlement of solids between the outer and inner tanks. The inflow into the inner tank will therefore have much of the solid waste removed.

In one example, the inner tank includes an outlet for passage of clarified liquid out of the inner tank and back into the liquid reservoir. The triple tank arrangement therefore typically promotes settling of solids between the tanks in a manner such that relatively clean liquid may be discharged from the inner tank back into the reservoir. In one example, the outlet in the inner tank may be positioned at a suitable height below the inflow pipes to the outer tanks such that remaining fine solid material can settle to the bottom of the inner tank and otherwise clarified liquid can flow back into the reservoir.

Outflow from the tanks can include additional clarifying arrangements. For example, the pipework between the outer and inner tanks, and between the inner tank and reservoir, could include filter screens, or the like, to filter out solid materials. In this regard, it will be appreciated that progressively finer filters could be used between the outer and inner tanks and the inner tank and reservoir, to thereby filter out progressively finer solids.

Additionally, pipe inflows can be arranged to provide further clarifying action. For example, the pipe inlets can have an increased diameter, so that flow rates into the pipes are reduced, thereby reducing agitation of fluid within the tanks. The pipes can be arranged with an inflow substantially parallel with the liquid surface, so that liquid is only extracted from an uppermost layer in the tank, thereby reducing inflow of liquid including entrained solids. In one particular example, the inlet is funnel or cup shaped, with notches around a rim, so that liquid flows into the inlet through the notches, thereby providing a further filtering action.

It is to be understood that the pipework may be configured in any suitable manner to achieve desired settling rates of solids and flow control between the tanks. In one example, the pipework between the first and second outer tanks and the inner tank includes a pipe that is bent proximate first or second ends. The pipe may be an angled pipe for example having a bend or elbow at approximately 90 degrees. Furthermore, the pipe between each respective outer tank and inner tank may be pivotable at least 90 degrees to permit the orientation of the first or second end of the pipe to vary relative to the respective outer and/or inner tank.

For example, if the end of the pipe in an outer tank is pivoted 90 degrees so that the end of the pipe faces a side of the tank (instead of facing down towards the bottom) then the effective height of the pipe inlet is increased relative to the depth of the tank thereby enabling the outer tank to fill to a greater level before flow is permitted into the inner tank. This may be desirable for example when relatively fine solids are being discharged into the outer tanks which take longer to settle. Pivoting the outlet end of each pipe which protrudes into the inner tank may be desirable to direct effluent flow into the inner tank in a generally tangential direction.

Typically, each collection tank includes a sump at a lower portion thereof in which solids settle. A pump may be connected to the sump to remove the solid waste and pump it back onto land for disposal.

The tanks are typically supported by a common framework, such as a steel frame or the like. The framework may have openings configured to receive each tank. To enable the tanks to float at or near the surface of the reservoir, one or more float members may be attached to the collection tanks.

In one example, the manifold includes a horizontal portion in which the inlets are disposed, and one or more upstanding end portions that terminate in the one or more discharge ports. Alternatively, the manifold may be horizontal and side discharge pipes may be connected at opposing ends of the manifold. The horizontal attitude of the manifold promotes mixing of solids and entrained liquid flow from each suction head assembly such that a substantially uniform discharge flows into the outer tanks which may assist in achieving similar weight distribution of solid materials settling in the outer tanks.

The one or more outlets of each suction head and the one or more corresponding inlets of the manifold typically comprise spigots to which one or more coupling members are engaged to thereby interconnect the suction head assemblies to the manifold. The coupling members may be any suitable form of piping, ducting or the like.

The apparatus further includes an air supply such as a compressed air source, an air supply line connected to the air supply and a plurality of air diffusers, each air diffuser positioned within a respective suction head and interconnected to the air supply line to enable air from the air supply to be introduced into each suction head.

The air supply line is typically disposed outside of the suction head assemblies and may run substantially parallel to the horizontal manifold. The air supply line typically has outlets interconnected with inlets of each air diffuser disposed proximate opposing ends thereof. Each air diffuser typically comprises a hollow elongated pipe including a plurality of air outlets, wherein in use, air enters the air diffuser through the inlets and exits as a stream of air bubbles via the air outlets to thereby create a suction pressure in the suction head.

In this way, the back or suction pressure created in the suction head will serve as an air lift to draw liquid and entrained solids into the outlets of each suction head and into the manifold. The suction pressure created in the suction head will assist in the agitation of solids settling in or around the suction head. The suction head may further include means to displace solids from the bottom of the liquid reservoir.

In one example, one or more chains are disposed beneath each suction head, the chains contactable with the bottom of the liquid reservoir to assist in displacing the settled solids as the apparatus is traversed along the bottom of the reservoir.

Typically, the plurality of suction head assemblies are arranged side-by-side and supported on skids to assist the apparatus traverse along the bottom of the liquid reservoir.

Furthermore, each suction head typically includes an elongated body which has an open lower side defining a mouth and a skirt disposed around the mouth to at least one of improve containment of the collected solids and control release of air bubbles from the air diffuser in order to maximise the suction pressure created in each suction head.

In another broad form, there is provided a method of collecting solids settling at the bottom of a liquid reservoir, the method including providing an apparatus in a liquid reservoir as herein described, and traversing the apparatus along the bottom of the liquid reservoir so as to collect solids settling on the bottom and discharge the collected solids into the collection tanks.

Figure 1B:
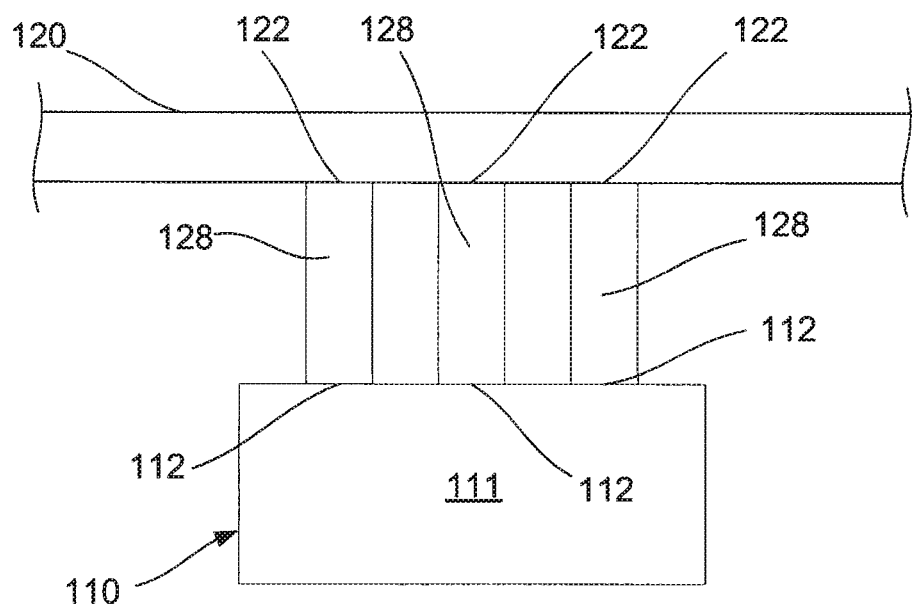
FIG. 1B is a schematic detailed front view of a suction head assembly of the apparatus of FIG. 1A showing interconnection with a manifold.
Figure 1C:
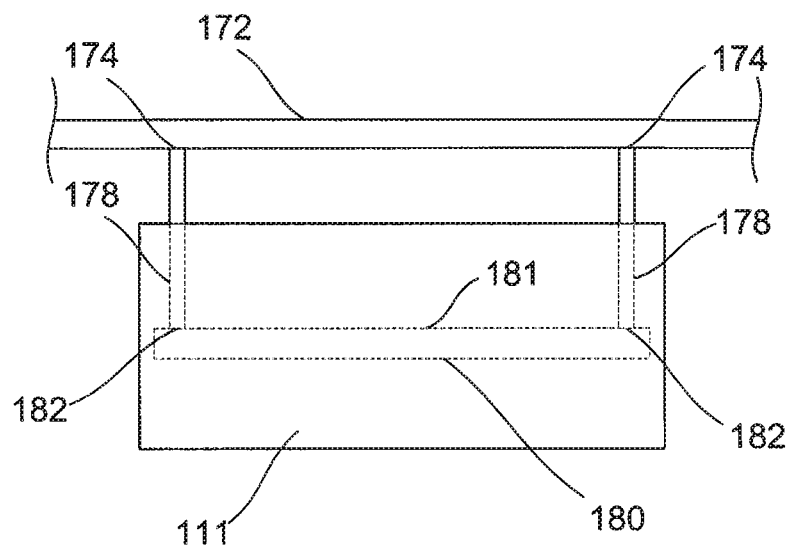
FIG. 1C is a schematic detailed front view of a suction head assembly of the apparatus of FIG. 1A showing interconnection with an air supply manifold.

Referring now to FIG. 1C, the air supply into each suction head 111 shall be described in further detail. An air supply (not shown) such as an air compressor or blower supplies air into the air supply line 170. A horizontal section 172 of the air supply line 170 is configured to run parallel to the manifold 120 outside of each suction head 111. Air intake tubes 178 are coupled between outlets 174 of the air supply line 172 and inlets 182 of an air diffuser 180 disposed within each suction head 111. Each air diffuser 180 has a generally elongate body having an upper surface in which the inlets 182 are disposed at opposing ends thereof. A plurality of apertures are positioned between the inlets 182 in the upper surface for allowing air bubbles to escape therefrom into the head 111 in order for a suction pressure to be created in the head 111 as will be described in more detail below.

Figure 2:
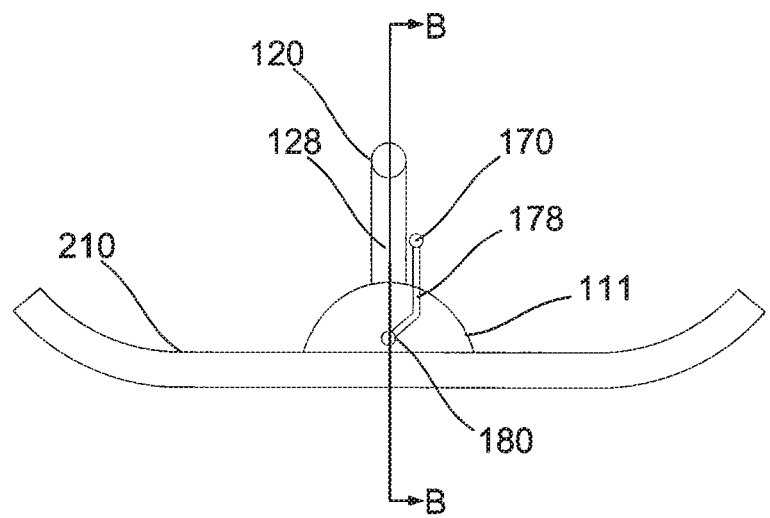
FIG. 2 is a schematic sectional view of the apparatus taken along section A-A of FIG. 1A.
Figure 3:
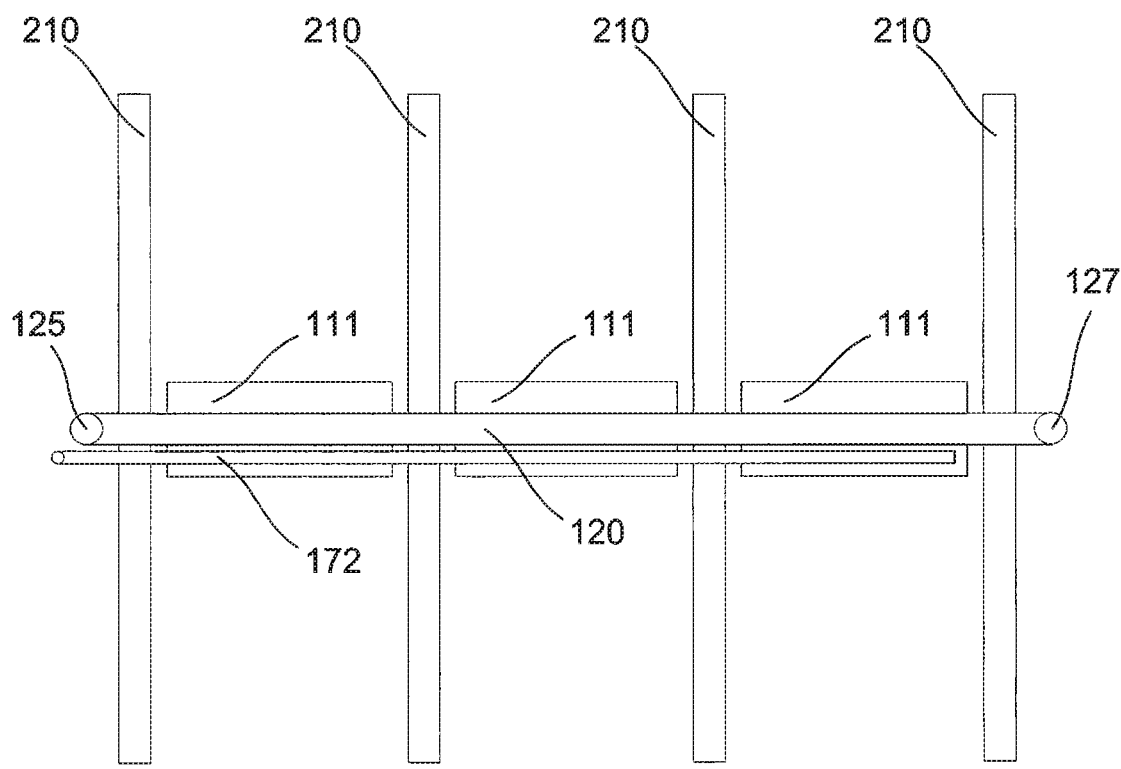
FIG. 3 is a schematic top view of the apparatus of FIG. 1A with the collection tanks removed for clarity.

The relative position of the air supply line 170 to the manifold 120 and suction heads 111 is shown in FIGS. 2 and 3. In this example, each suction head 111 has a generally dome shaped housing. The coupling members 128 extend upward from the top of the suction head 111 to the horizontal segment of the manifold 120 which is centrally aligned with respect to the plurality of suction heads 111. The horizontal segment 172 of the air supply line 170 runs parallel to the horizontal segment of the manifold 120 in offset relation thereto. The air intake tubes 178 then enter the suction head 111 through separate openings provided in the head 111. In the configuration shown in FIG. 2, the air intake tubes 178 are formed with an angled section to direct the tube towards the air diffuser 180 which is offset to the supply line 172. In other arrangements, the air intake tube may be provided without the bent or angled portion.

The plurality of suction head assemblies 110 may be supported for movement over the bottom B of the liquid reservoir by supports which suitably support the suction head assemblies 110 in a substantially horizontal attitude.

The supports may comprise skids 210 provided at opposite ends of each suction head assembly as best shown in FIG. 3.

Figure 4:
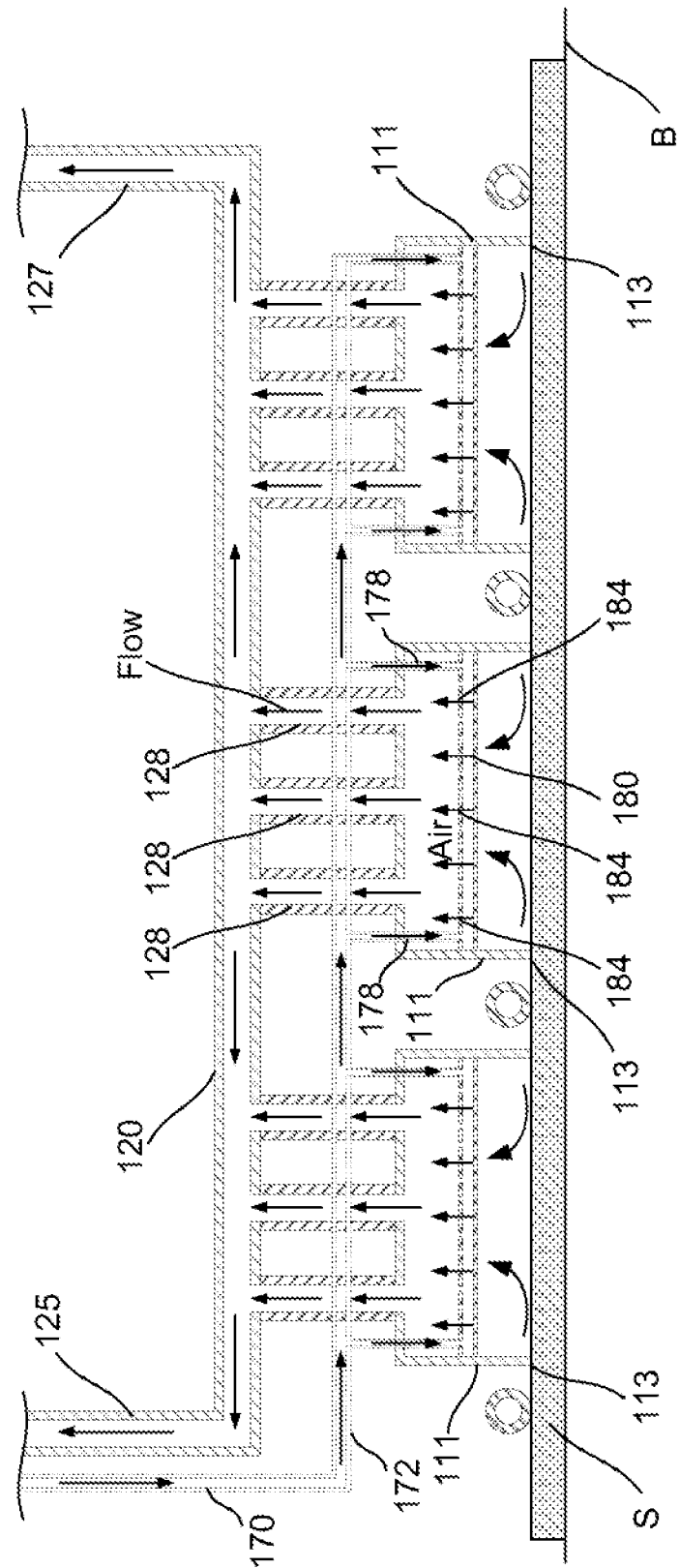
FIG. 4 is a schematic cross sectional view of the apparatus taken along section B-B of FIG. 2.

Referring now to FIG. 4, the operation of the suction head assemblies 110 shall be described in further detail.

In use, the apparatus 100 is moved across a section of the bottom B of the liquid reservoir having a layer of sludge or other solids S that are to be removed from the reservoir. Although not shown, it is to be appreciated that the apparatus 100 is generally moved across the reservoir by a winch system having a cable coupled directly or indirectly to the apparatus 100. The winch system is typically positioned on the bank of the reservoir for movement there along, although alternatively the winch system could be mounted on the apparatus 100 and attached to anchor points, allowing the apparatus 100 to be moved as required.

To initiate suction, the air supply (not shown) is turned on so that compressed air or the like flows into the air supply line 170. The air will flow through the supply line 170 and into the air diffuser 180 of each suction head 111. Typically, a horizontal portion 172 of the supply line 170 which runs parallel to a horizontal segment of the manifold 120 will have a plurality of outlets 174 (as shown in FIG. 1C). These outlets 174 are coupled to inlets 182 of the air diffuser 180 via air intake tubes 178. Each air diffuser 180 is an elongate body having a plurality of apertures 184 in an upper portion 181 thereof. The apertures 184 allow air to exit each air diffuser 180 as air bubbles into each suction head 111.

The air will then pass upwardly into the coupling members 128 which interconnect the outlet spigots of each suction head 111 with the inlet spigots of the manifold 120. This creates a back or suction pressure with in the head 111 and serves as an air lift to draw liquid and entrained solids into the manifold 120 via the coupling members 128. The liquid and entrained solids then flow along the horizontal segment of the manifold 120 before being drawn up the side discharge pipes 125, 127 and expelled via the discharge ports 124, 126 into the outer tanks 130, 150.

The suction pressure created in the suction heads 111 will assist in agitating the solids S at the bottom of the reservoir. To further assist the agitation, displacing means may also be provided below or adjacent each suction head. In one example, one or more chains (not shown) are disposed beneath each suction head 111, the chains contactable with the bottom B of the liquid reservoir to assist in displacing the settled solids as the apparatus 100 is traversed along the bottom B of the reservoir.

Each suction head 111 may also include skirting 113 which contacts the bottom B of the reservoir when the suction head assembly 110 is being traversed along the bottom. The skirting 113 may assist in preventing air bubbles from escaping from the head 111 to maximize the suction pressure obtained and increase efficiency of the apparatus 100. The skirt 113 may also ensure that solids are contained within the head during collection.

Figure 5:
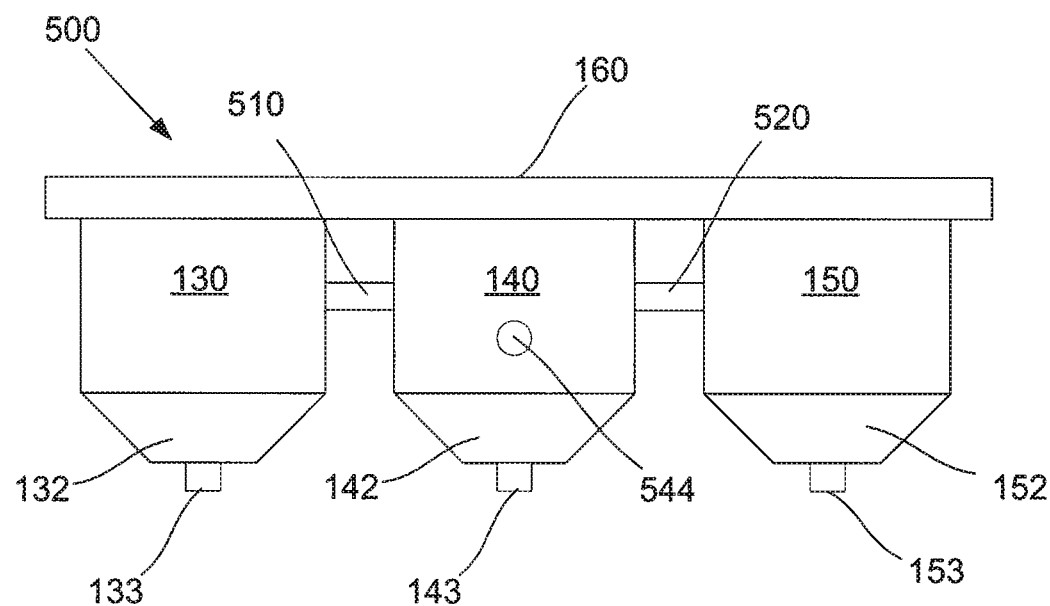
FIG. 5 is a schematic front view of the floating collection tanks used with the apparatus of FIG. 1A.
Figure 6:
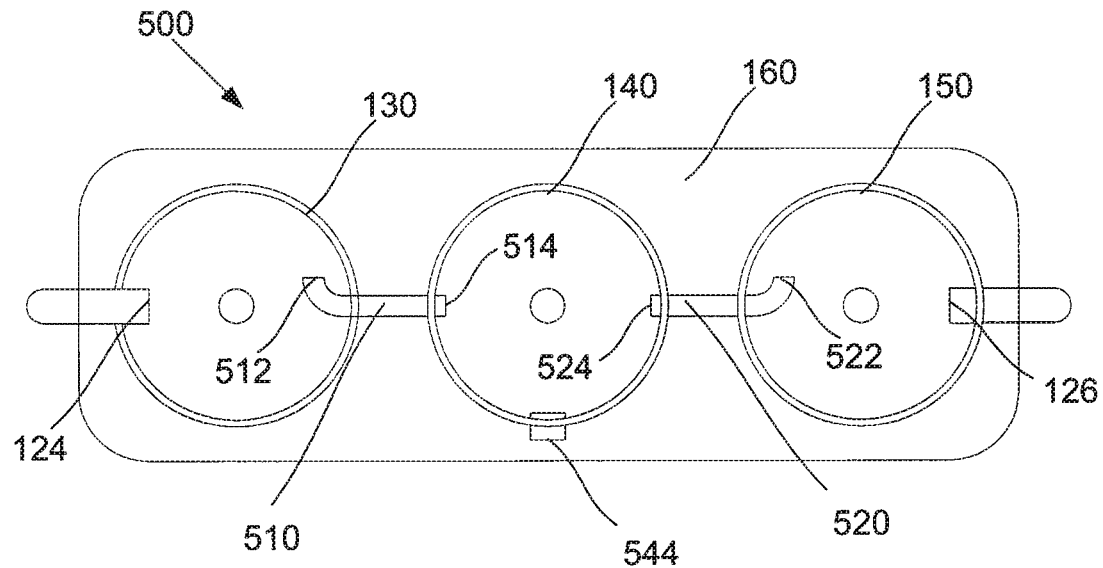
FIG. 6 is a schematic top view of an example of an arrangement of pipework interconnecting the collection tanks shown in FIG. 5.

Referring now to FIGS. 5 and 6, the floating collection tank arrangement of FIG. 1A shall be described in more detail.

In this example, the floating collection tank arrangement 500 includes three tanks 130, 140, 150 disposed in a side-by-side configuration. The arrangement 500 includes first and second outer tanks 130, 150 and an inner tank 140 that is centrally located between the outer tanks 130, 150. Although not shown in these schematic diagrams, the tanks are typically supported in a common main steel framework. A float member 160 is positioned proximate the top of the tanks and retained thereto to provide buoyancy to the tank arrangement 500. The float member 160 may comprise a single member coupled to each of the collection tanks or alternatively each tank may have its own float member and adjacent floats may be coupled together.

Each collection tank 130, 140, 150 typically includes a chamber having a cylindrical section which leads to a sump 132, 142, 152 at a lower portion thereof in which solid material settles for subsequent removal from the tank. Outlets 133, 143, 153 typically extend from the respective sumps for attachment to hosing or ducting which allows solid material to be pumped out of the tanks, for example onto a bank of the reservoir for disposal.

In the tank arrangement 500, effluent flow between the outer and inner tanks is controlled via pipework 510, 520 which interconnects the respective tanks. In this example, the pipework 510, 520 consists of a pipe coupling having a 90 degree elbow joint. Pipe coupling 510 has an inlet 512 disposed in outer tank 130 and an outlet 514 disposed in the inner tank 140. The elbow joint of pipe coupling 510 is located proximate the inlet 512. In the example shown in FIG. 6, the pipe coupling 510 is oriented such that the inlet 512 faces a side wall of the tank 130. In other arrangements, the pipe coupling 510 may be oriented so that the inlet 512 is generally downward facing in the outer tank 130.

The pipe coupling 520 shown in FIG. 6 is similarly arranged to pipe coupling 510. Pipe coupling 520 has an inlet 522 disposed in outer tank 150 and an outlet 524 disposed in the inner tank 140. The elbow joint of pipe coupling 520 is located proximate the inlet 522. In the example shown in FIG. 6, the pipe coupling 520 is oriented such that the inlet 522 faces a side wall of the tank 150. In other arrangements, the pipe coupling 520 may be oriented so that the inlet 522 is generally downward facing in the outer tank 150. As previously mentioned, the pipework 510, 520 can include arrangements for further clarifying the liquid, including filters, shaped inlets, or the like.

Figure 7:
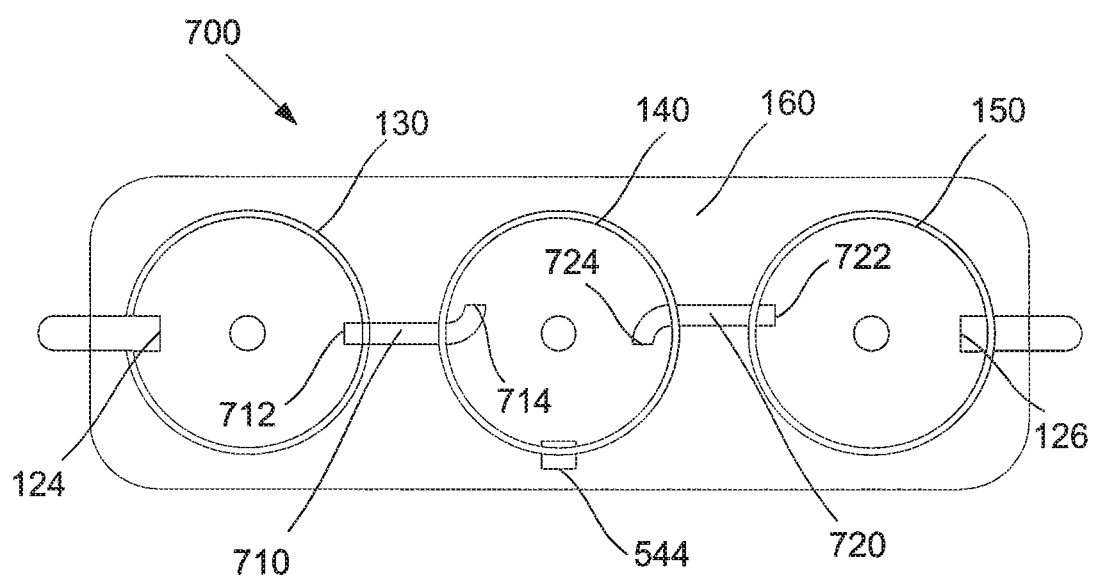
FIG. 7 is a schematic top view of a further example of an arrangement of pipework interconnecting the collection tanks shown in FIG. 5.

Referring now to FIG. 7, a collection tank arrangement 700 is shown having an alternative pipe coupling configuration between the tanks. In this arrangement, pipe coupling 710 extends between outer tank 130 and inner tank 140, the pipe coupling 710 having an inlet 712 disposed in the outer tank 130 and an outlet 714 disposed in the inner tank 140. The pipe coupling 710 has an elbow joint which in use, is positioned in the inner tank 140. The elbow joint is located proximate outlet 714. In this example, pipe coupling 710 is oriented so that the outlet 714 faces a side wall of the inner tank 140. In this way, effluent is caused to flow into the inner tank 140 in a generally tangential direction with respect to the chamber of the inner tank 140.

A similar pipe coupling 720 extends between the outer tank 150 and the inner tank 140. The pipe coupling 720 has an inlet 722 disposed in the outer tank 150 and an outlet 724 disposed in the inner tank 140. The pipe coupling 720 has an elbow joint which in use, is positioned in the inner tank 140. The elbow joint is located proximate outlet 724. In this example, pipe coupling 720 is oriented so that the outlet 724 faces a side wall of the inner tank 140. In this way, effluent is caused to flow into the inner tank 140 in a generally tangential direction with respect to the chamber of the inner tank 140. Furthermore, the outlet 724 is disposed so that the direction of flow into the inner tank 140 is the same as from the outlet 712 of pipe coupling 710 (i.e. clockwise in this example).

Again, the pipework 710, 720 can include arrangements for further clarifying the liquid, including filters, shaped inlets, or the like.

It will be appreciated that the pipe coupling between the respective outer and inner tanks may take any desired form. The pipe may have elbow joints proximate both the inlet and outlet. In such an arrangement, the respective inlet and outlets may have parallel central axes, whilst in other embodiments the respective axes may be orthogonally disposed.

Figure 8A:
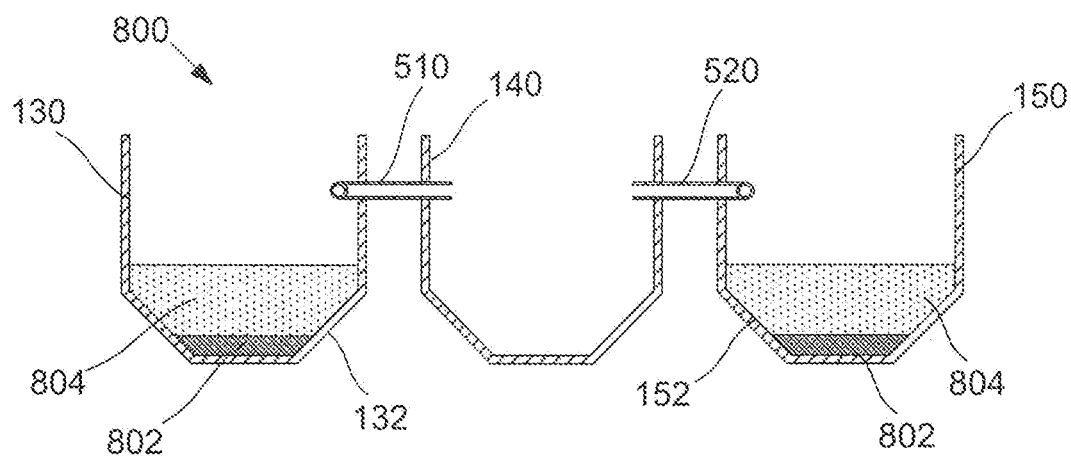
FIGS. 8A to 8C provide a sequence of sectional views through the collection tanks of FIG. 5 illustrating the progressive reduction of settled solids between the outer tanks and the inner tank.
Figure 8B:
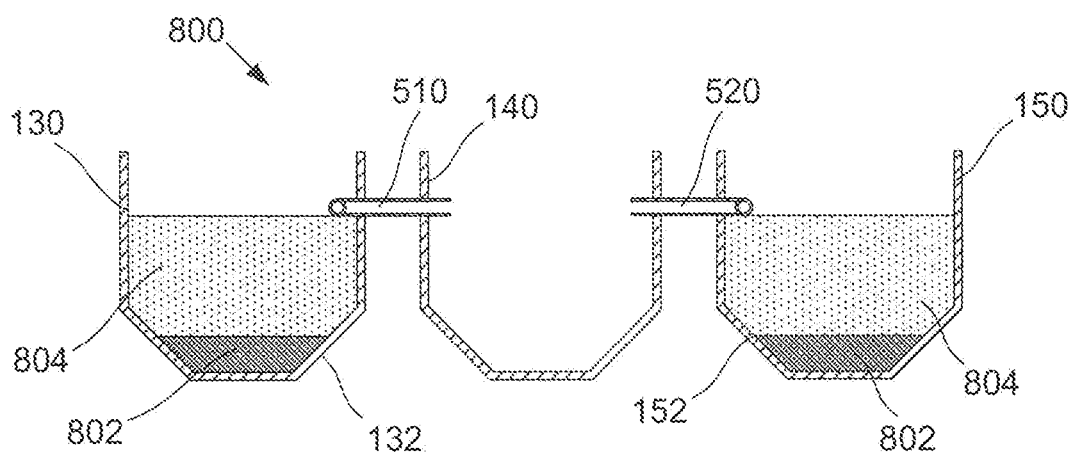
Figure 8C:
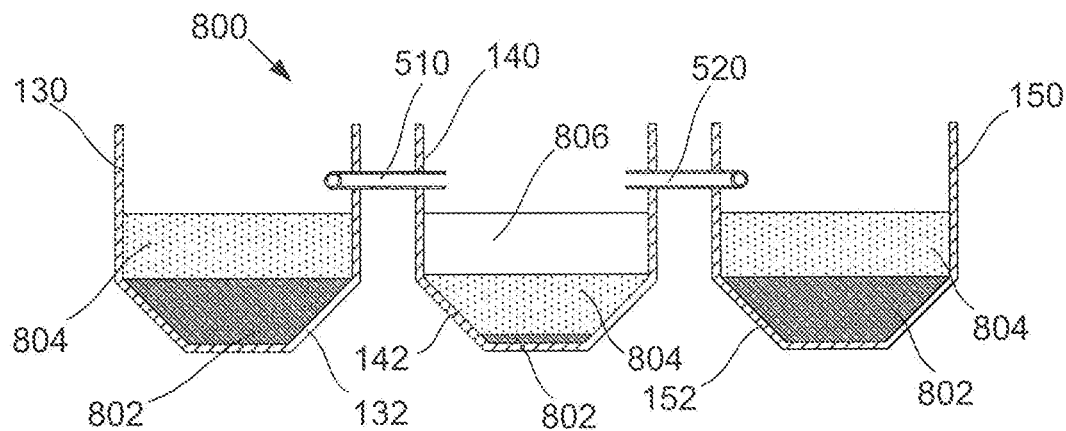

In operation, collected solids entrained in a liquid flow will be discharged from discharge ports 124, 126 of the manifold 120 into respective outer tanks 130, 150. Referring now to FIGS. 8A to 8C, the settling of solids in the collection tanks will be described in further detail.

In FIG. 8A, effluent flows into the outer tanks 130, 150 from the discharge pipes of the manifold. The larger and more dense solids particles 802 will fall to the bottom of each outer tank 130, 150, into respective sumps 132, 152. Effluent liquid 804 containing finer particles with lower density will begin to fill the outer tanks 130, 150. In FIG. 8B, as more effluent is discharged into the outer tanks 130, 150, more solids 802 will settle and the level of effluent 804 with finer particles of lower density will rise until the level of the pipe couplings 510, 520 is reached. The liquid 804 will then flow into the inlets of each pipe coupling 510, 520 and through the pipework before exiting through the outlets of the pipe couplings into the inner tank 140 where further settling occurs.

The inflow into the inner tank 140 will therefore contain mostly finer particles with most of the larger and denser solid material having settled in the outer tanks 130,150. In this way, a progressive reduction of settled solids between the outer tanks 130, 150 and the inner tank 140 is able to be achieved. As depicted in FIG. 8C, the inner tank 140 will contain a relatively small amount of the larger and/or more dense solid particles 802 and the finer particles will also begin to settle in the sump 802.

As this occurs, relatively clarified liquid 806 will begin to fill up the inner tank 140 which will exit through outlet 544 and flow back into the liquid reservoir. The solid material collected in the respective sumps can then be pumped out of the collection tanks and to a bank of the reservoir for example for subsequent disposal. Again, the outlet 544 can include arrangements for further clarifying the liquid, including filters, shaped inlets, or the like.

The design of the system enables the outer tanks 130, 150 to fill at substantially the same rate which assists in maintaining balance and weight distribution between the tanks. The pipework can be positioned at a selected height in the outer tanks to control the depth of liquid in the outer tanks and flow control between the tanks. The particular orientation of the pipework can be varied so as to achieve optimal decanting and desired settling rates of solids.

Whilst the tanks 130, 140, 150 are shown as open tanks in the above described examples, this is not essential and alternatively the tanks could be enclosed in order to contain odours.

Figure 9:
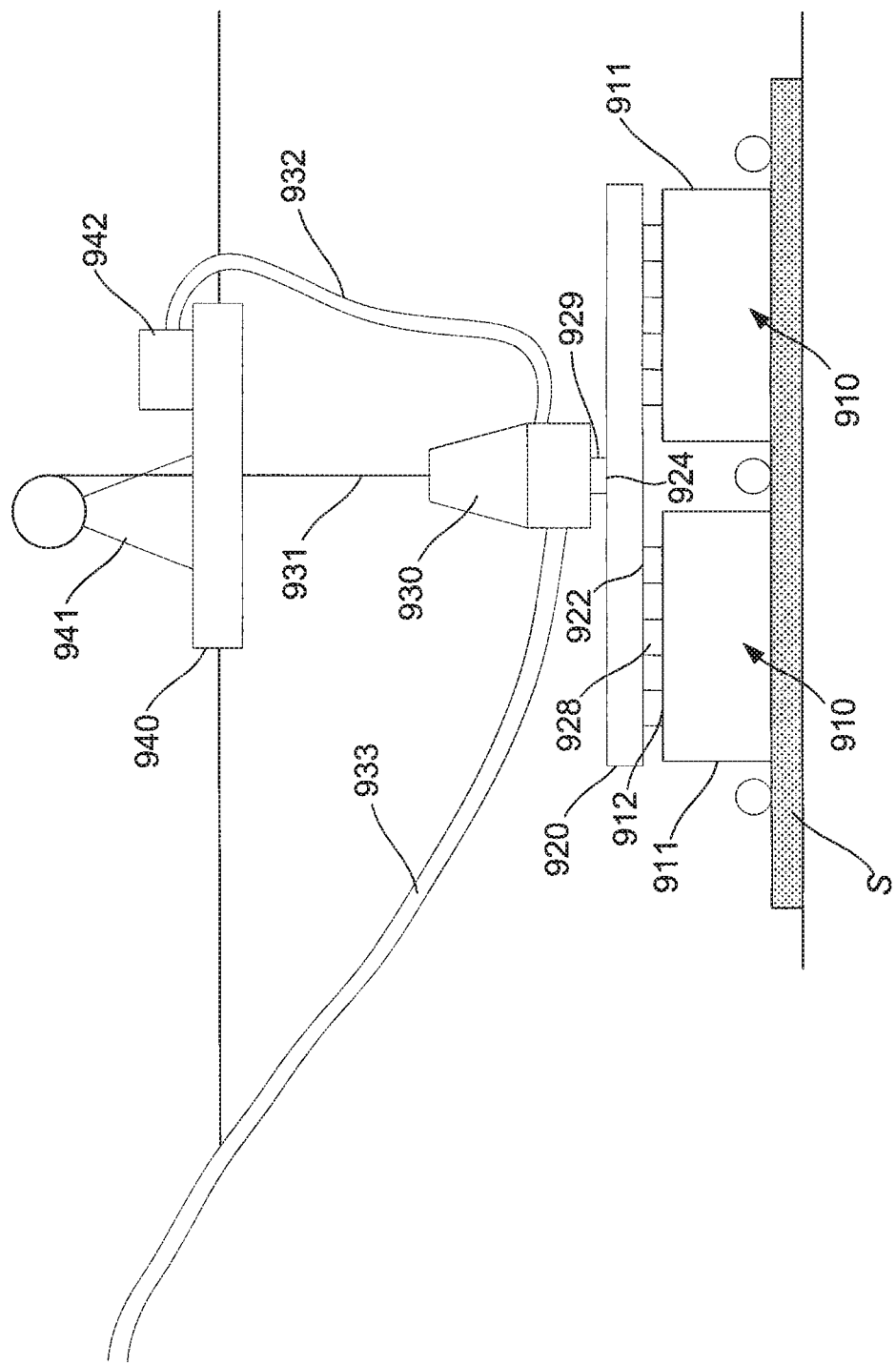
FIG. 9 is a schematic front view of a second example of an apparatus for collecting solids settling at the bottom of a liquid reservoir; and, FIG. 10 is a schematic side view of the apparatus of FIG. 9.
Figure 10:
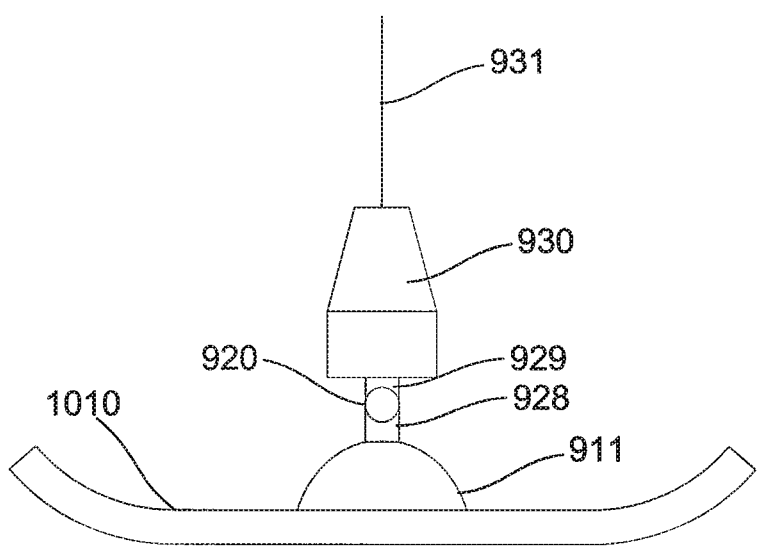

A further example of an apparatus for collecting solids will now be described with reference to FIGS. 9 and 10.

In this example, the apparatus again includes a plurality of suction head assemblies 910, each suction head assembly including a hollow suction head 911 configured to cause agitation of solids settling in or around the suction head and to draw the solids entrained in a liquid flow into one or more outlets 912 of the suction head. The apparatus further includes a manifold 920 including a body having one or more inlets 922 coupled to the one or more outlets 912 of each suction head to permit the collected solids entrained in the liquid flow to pass into the manifold 920. The manifold further includes one or more discharge ports 924 configured to expel the collected solids entrained in the liquid flow from the manifold.

A pumping arrangement 930 is provided that draws in liquid and entrained solids from the suction head assemblies 910, via the manifold 920, and discharges the liquid and entrained solids via a discharge pipe 933.

Accordingly, it will be appreciated that in this example, the apparatus includes a similar configuration to that described in the previous example of FIGS. 1 to 8, specifically including suction heads in fluid communication with a manifold to allow extraction of solids via multiple suction head assemblies, whilst using a single pumping arrangement. It will therefore be appreciated that in broad terms operation of the system is similar to that described above.

However, in contrast to the previous example, the pumping arrangement pumps out liquid and entrained solids via a discharge pipe, which can extend to shore, allowing the solid material to be disposed of on-shore, as opposed to using the above described floating tank arrangement. This can allow for easier removal of waste, for example allowing the solid material to be pumped into a transportable tanker, either directly or via a settling tank. This also assists in using sealed tanks, which can in turn reduce unwanted odours.

A number of further features will now be described.

In one example, the apparatus includes a pontoon 940, with the suction head assemblies being attached to the pontoon, for example by having these suspended from the pontoon 940 for example using a cable 931, attached to a winch 941, allowing the suction head assemblies 910 to be raised or lowered as required, whilst also allowing for lateral movement by virtue of movement of the pontoon, for example through the use of shore mounted winches.

In one example, the pumping arrangement can be similar to that described above, involving pumping air directly into the suction heads. However, this is not essential, and in an alternative preferred arrangement, the pumping arrangement includes a suction pump 930 including an inlet coupled to the manifold discharge port 924 and an outlet coupled to the discharge pipe 933. The pump 930 can be mounted on the pontoon 940, but more typically is submerged within the liquid reservoir, in particular being attached to the manifold outlet 924 via connecting pipe 929, or a direct connection. Providing the pump 930 close to the manifold increases the effectiveness of the pumping action, in particular increases pressure and/or flow at the suction heads to thereby increases the solid removal effectiveness, while facilitating pumping direct to shore.

The pump 930 can be of any suitable form, but in one example, includes an air operated diaphragm pump 930, in which case the apparatus further includes an air supply 942 and an air supply line 932 connected to the air supply and the suction pump. In general a diaphragm pump 930 offers a higher degree of pumping action, further facilitating extraction of the solids and transfer to shore. Whilst the air supply 942 could be shore mounted, more typically this is mounted on the pontoon 940 to reduce the length of the air supply line 932.

The discharge pipe 933 can extend to the shore based tank arrangement, either directly, or by having the discharge pipe extend to the pontoon, and then from the pontoon to the shore.

The tank arrangement can include a plurality of collection tanks configured to allow progressive clarification of the discharge through settling of the solid material. This can be similar to the tank arrangement described above with respect to FIGS. 1 to 8, albeit shore mounted as opposed to floating.

Additionally, and or alternatively, the tank arrangement can include a vehicle for removing at least the solid material. In either case, the tanks can be enclosed, to thereby reduce the release of odours.

In one example, the one or more outlets 912 of each suction head 910 and the one or more corresponding inlets 922 of the manifold 920 comprise spigots to which one or more coupling members 928 are engaged to thereby interconnect the suction head assemblies to the manifold. In the current example, the coupling members 928 are shorter than those of the previous example, so that the manifold is closer to the suction head assemblies 910, and it will be appreciated that these could be removed entirely so that the manifold inlets 922 are directly connected to the suction head outlets 912. This reduces the length of the flow path between the suction head and the pump 930, increasing pump effectiveness.

The suction head assemblies 910 are typically arranged side-by-side and supported on skids 1010 to assist the apparatus traverse along the bottom of the liquid reservoir. In the current example, a dual head assembly is shown, with two suction heads mounted in a side by side arrangement. Whilst a larger number of heads could be used, this would increase the degree of pumping action required for the apparatus to function effectively, and is not necessarily desirable.

It will be appreciated that the apparatus could also include further features that assist in removal of solids. For example, one or more chains can be disposed beneath each suction head, with the chains contacting the bottom of the liquid reservoir to assist in displacing the settled solids as the apparatus is traversed along the bottom of the reservoir. Each suction head can also include an elongated body which has an open lower side defining a mouth and a skirt disposed around the mouth to at least one of improve containment of the collected solids and control release of air bubbles from the air diffuser.

Accordingly, the above described arrangements provide a simple apparatus for cleaning a pond or other liquid reservoir that is able to efficiently traverse a larger surface area to remove solid material such as sludge and promote an enhanced clarification of liquid through an improved collection tank arrangement.

It will be appreciated that two different apparatus configurations are described, and that different features of these can be used interchangeably or in conjunction. For example, the suction pump and air pump arrangements of the two examples could be interchanged.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

What is claimed is:

1. Apparatus for collecting solids settling at the bottom of a liquid reservoir, the apparatus including:
    a) a plurality of suction head assemblies, each suction head assembly including a hollow suction head configured to cause agitation of solids settling in or around the suction head and to draw the solids entrained in a liquid flow into one or more outlets of the suction head, wherein the plurality of suction head assemblies are arranged side-by-side and supported on skids to assist the apparatus traverse along the bottom of the liquid reservoir and wherein each suction head includes an elongated dome shaped housing which has an open lower side defining a mouth and a skirt disposed around the mouth to at least one of improve containment of the collected solids;
    b) a manifold connected to the plurality of suction head assemblies, the manifold including a body having:
        i) one or more inlets coupled to the one or more outlets of each suction head to permit the collected solids entrained in the liquid flow to pass into the manifold, the one or more inlets being disposed in a horizontal portion of the manifold to promote mixing of solids and entrained liquid flow from each suction head assembly, coupling members extending upwardly from the top of each suction head to the horizontal portion, which is centrally aligned with respect to the plurality of suction heads; and,
        ii) one or more discharge ports configured to expel the collected solids entrained in the liquid flow from the manifold; and,
    c) a pumping arrangement that draws in liquid and entrained solids from the suction head assemblies via the manifold and discharges the liquid and entrained solids via a discharge pipe.

2. Apparatus according to claim 1, wherein the pumping arrangement includes a suction pump including an inlet coupled to the discharge port and an outlet coupled to the discharge pipe.

3. Apparatus according to claim 2, wherein the suction pump is submerged in the liquid reservoir.

4. Apparatus according to claim 2, wherein the suction pump is an air operated diaphragm pump.

5. Apparatus according to claim 4, wherein the apparatus further includes:
    a) an air supply; and,
    b) an air supply line connected to the air supply and the suction pump.

6. Apparatus according to claim 1, wherein the apparatus includes a pontoon that supports at least one of:
    a) suction head assemblies;
    b) a suction pump; and,
    c) an air compressor.

7. Apparatus according to claim 1, wherein the discharge pipe extends to a shore based tank arrangement.

8. Apparatus according to claim 7, wherein the tank arrangement includes a plurality of collection tanks configured to allow progressive clarification of the discharge through settling of the solid material.

9. Apparatus according to claim 7, wherein the tank arrangement includes a vehicle for removing at least the solid material.

10. Apparatus according to claim 1, wherein the one or more outlets of each suction head and the one or more corresponding inlets of the manifold comprise spigots to which one or more coupling members are engaged to thereby interconnect the suction head assemblies to the manifold.

11. A method of collecting solids settling at the bottom of a liquid reservoir, the method including:
    a) providing an apparatus as claimed in claim 1 in a liquid reservoir; and, b) traversing the apparatus along the bottom of the liquid reservoir so as to collect solids settling on the bottom.

* * * * *